United States Patent [19]
Spitz

[11] Patent Number: 5,082,040
[45] Date of Patent: Jan. 21, 1992

[54] VEHICLE WHEEL FOR A PNEUMATIC TIRE

[75] Inventor: Wolfgang Spitz, Hannover, Fed. Rep. of Germany

[73] Assignee: Continental Aktiengesellschaft, Hannover, Fed. Rep. of Germany

[21] Appl. No.: 586,531

[22] Filed: Sep. 21, 1990

[30] Foreign Application Priority Data

Sep. 22, 1989 [DE] Fed. Rep. of Germany ....... 3931675

[51] Int. Cl.⁵ .......................... B60C 17/04; B60B 21/02
[52] U.S. Cl. .................... 152/379.3; 152/380; 152/DIG. 20
[58] Field of Search .............. 152/375, 379.3, 379.4, 152/379.5, 380, 381.3, 381.4, 384, DIG. 20

[56] References Cited

U.S. PATENT DOCUMENTS

| | | | |
|---|---|---|---|
| 1,885,484 | 11/1932 | Shoemaker | 152/379.3 X |
| 1,903,575 | 4/1933 | Shoemaker | 152/379.3 X |
| 4,630,662 | 12/1986 | Howind | 152/DIG. 20 |
| 4,655,270 | 4/1987 | Howind | 152/DIG. 20 |
| 4,694,873 | 9/1987 | Gerloff et al. | 152/DIG. 20 |
| 4,696,333 | 9/1987 | Rach et al. | 152/379.3 |

FOREIGN PATENT DOCUMENTS 3529513 2/1987 Fed. Rep. of Germany ... 152/DIG. 20

Primary Examiner—Russell D. Stormer
Attorney, Agent, or Firm—Robert W. Becker & Associates

[57] ABSTRACT

A vehicle wheel for a pneumatic tire of elastomeric material is provided. The bead portions of the tire are disposed on the radially inner periphery of the wheel rim, and the carcass of the tire is anchored in the bead portions by being looped-around pull and compression-resistant bead cores. The wheel has a rigid rim having essentially inwardly extending rim flanges and, axially inwardly thereof, rim seating surfaces for the bead portions of the tire. The rim flanges have abutment surfaces that face the bead portions of the tire and are inclined outwardly at an angle of between 5° and 50° relative to the radial direction.

9 Claims, 6 Drawing Sheets

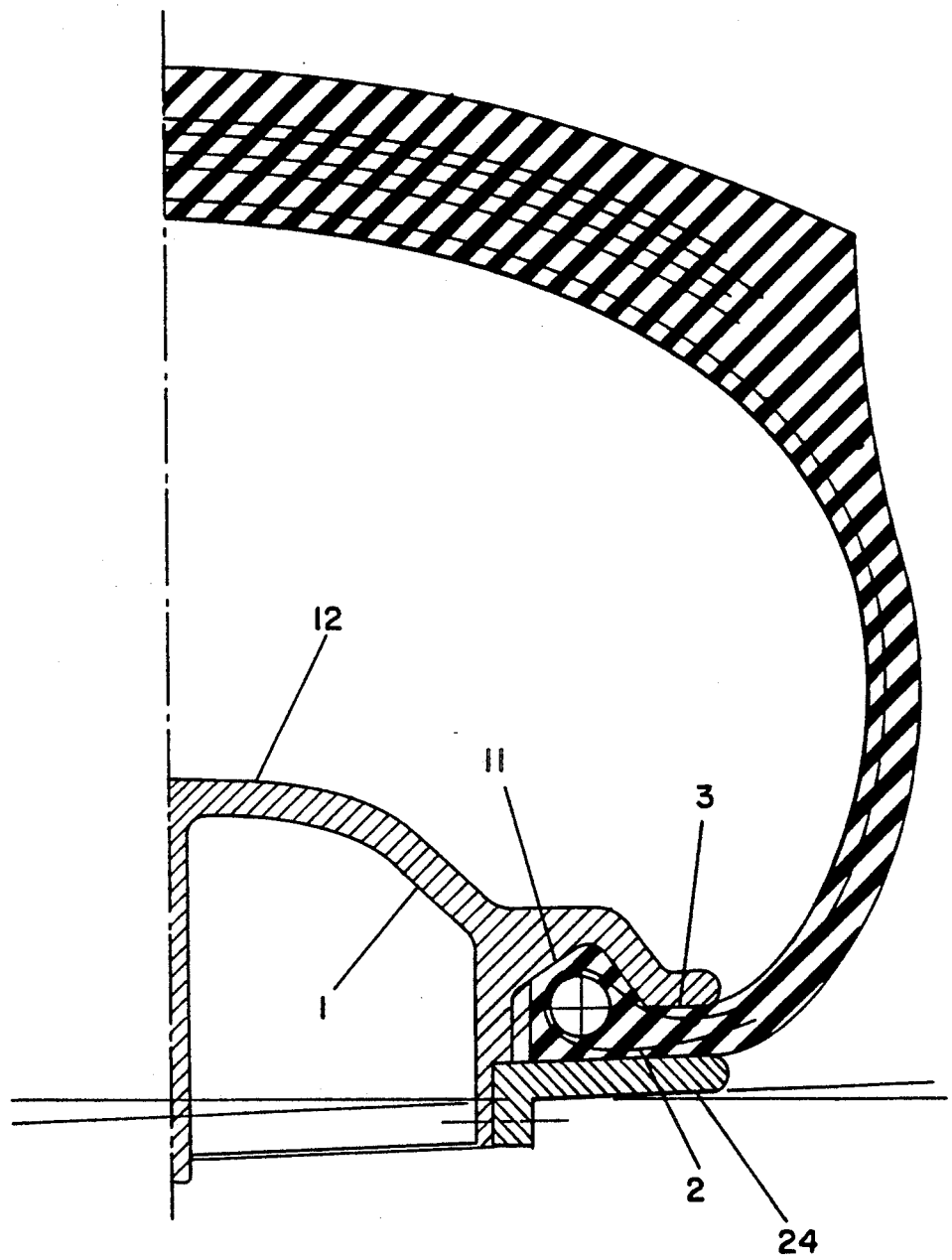
FIG—9

VEHICLE WHEEL FOR A PNEUMATIC TIRE

BACKGROUND OF THE INVENTION

The present invention relates to a vehicle wheel for a pneumatic tire of elastomeric material, namely rubber or rubber-like synthetic material, where the bead portions of the tire are disposed on the radially inner periphery of the wheel rim, and the carcass of the tire is anchored in the bead portions thereof by being looped around pull and compression-resistant bead cores, and where the wheel has a rigid rim having essentially inwardly extending rim flanges and, axially inwardly thereof, rim seating surfaces for the bead portions of the tire; support surfaces for a flat-tire operation can be provided on the radially outer side.

A vehicle wheel of this general type is disclosed, for example, in DE-OS 30 00 428 and in DE-OS 38 04 505. With these heretofore known vehicle wheels, the lateral rim flanges extended exactly radially inwardly i.e. perpendicular to the axis of the rim in order to achieve an adequate seating pressure reliability. With these known vehicle wheels, mounting of the tire is effected with special tools that must ensure that during the mounting process, the tire bead, which has a larger diameter, can surmount the rim flanges.

It is an object of the present invention to facilitate mounting of the tire while maintaining the seating pressure reliability.

BRIEF DESCRIPTION OF THE DRAWINGS

This object, and other objects and advantages of the present invention, will appear more clearly from the following specification in conjunction with the accompanying schematic drawings, in which:

FIG. 9 is a partial radial cross-sectional view of another exemplary embodiment of the inventive vehicle wheel showing a safety ring that extends conically radially outwardly and thus assumes the function of a clamping wedge.

SUMMARY OF THE INVENTION

The vehicle wheel of the present invention is characterized primarily in that the rim flanges have abutment surfaces that face the bead portions of the tire and are inclined outwardly at an angle of between 5° and 50° relative to the radial direction.

The present invention is based upon the surprising recognition that an adequate seating pressure reliability can be achieved even if the rim flanges, without altering their height, are disposed at an angle, and in particular preferably at an angle of inclination of between 25° and 35° relative to the radial direction. An explanation for this can be that as a consequence of such an arrangement, the radially inwardly directed components of forces that act upon the pull and compression-resistant bead cores are reduced, thereby in turn reducing the danger of a lateral bending of the bead cores. Due to the inclined orientation of the rim flanges, the advantage of a considerably easier mounting and removal of the tire is achieved.

Pursuant to one advantageous specific embodiment of the present invention, the axially outer portion of the rim flanges is also inclined, so that the tire wall, and hence the carcass, are supported over a larger region. Pursuant to another advantageous specific embodiment, the rim seating surfaces for the tire beads, which surfaces are disposed axially inwardly of the rim flanges, are inclined relative to the axial direction in such a way that the largest diameter in the vicinity of the seating surfaces is disposed axially outwardly; the angle of inclination can be between 10° and 40°, and is preferably about 30°.

Further specific features of the present invention will be described in detail subsequently.

DESCRIPTION OF PREFERRED EMBODIMENTS

Figure 1:
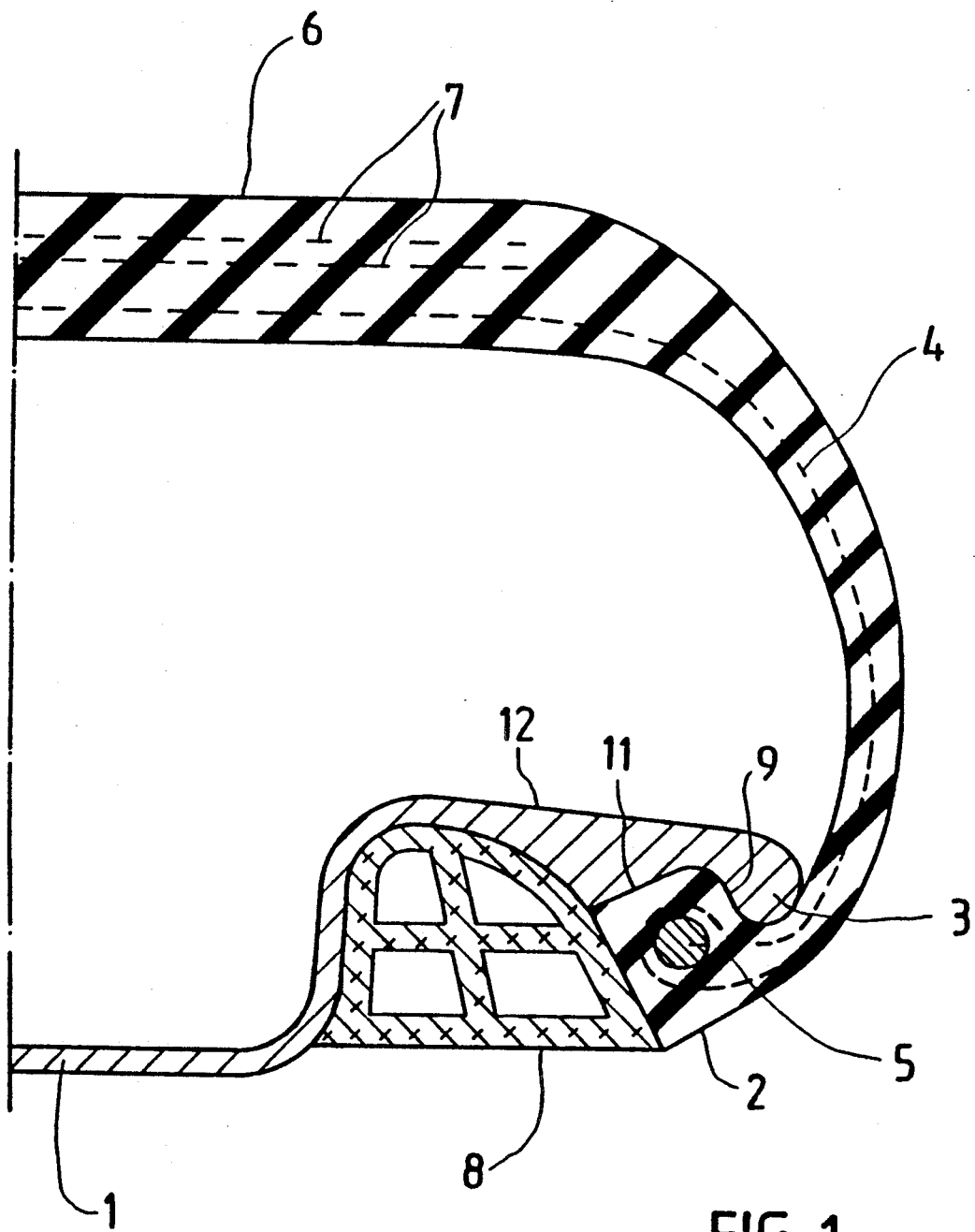
FIG. 1 is a partial radial cross-sectional view through one exemplary embodiment of the inventive vehicle wheel showing an inclined rim flange and an inclined seating surface for the tire bead.

Referring now to the drawings in detail, the vehicle wheel illustrated in FIG. 1 essentially comprises a rigid, one-piece wheel rim 1 that in a customary manner is welded onto a non-illustrated rim well. The bead portions 2 of a tire are mounted on the radially inner periphery of the rim 1 next to laterally outwardly disposed rim flanges 3 that extend inwardly.

The tire is preferably a belted tire having a relatively small height to width ratio, with a radial carcass 4 being anchored in the bead portions 2 by being looped-around pull and pressure resistant bead cores 5. Disposed between the carcass 4 and the tread surface 6 is a conventional reinforcement belt 7. A cover or filler ring 8 that is known per se can be disposed axially inwardly of the tire bead 2.

Figure 2:
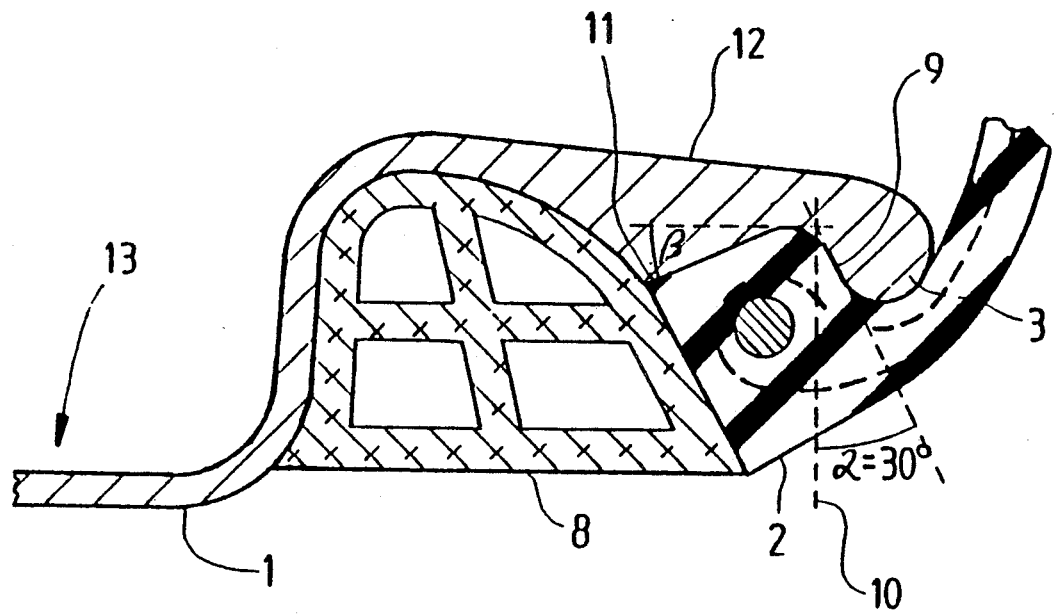
FIG. 2 is an enlarged view of a portion of the vehicle wheel of FIG. 1 in the region of the rim flange and tire bead.

As can be seen in particular in the enlarged partial view of FIG. 2, the abutment surface 9, which faces the bead portion 2, extends at an angle $\alpha$ of approximately 30° relative to the radial direction 10. Adjoining the rim flange 3 on the axially inner side is a rim seating surface 11 for the tire bead 2. This rim seating surface 11 is also inclined at an angle to the radial direction 10 and in particular in such a way that it has its smallest diameter axially inwardly of the rim flange. The angle of inclination $\beta$ is 30° in the illustrated embodiment. If necessary, the values for the angle $\alpha 0$ can be between 5° and 50° while the values for the angle $\beta$ can be between 10° and 40°. Radially outwardly of the rim seating surfaces 11, the rim 1 forms support surfaces 12 for a flat-tire operation that are inclined at a flat angle toward the outside; disposed in the central portion of the rim 1 is a drop-center 13.

Figure 3:
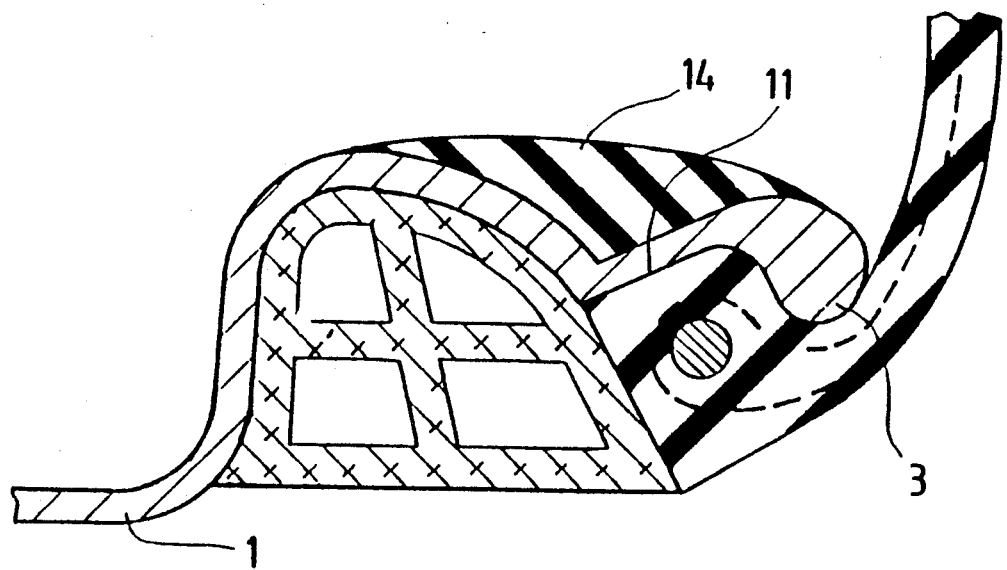
FIG. 3 is a cross-sectional view of a portion of another exemplary embodiment of the inventive vehicle wheel where the rim radially outwardly forms a groove that is filled with a rubber cushion or padding layer.

FIG. 3 shows a variation that in the region of the rim flange 3 and the rim seating surface 11 corresponds to the embodiment of FIG. 1, whereas radially outwardly the rim 1 forms a groove-like indentation that is filled by a rubber cushion or padding layer 14 that again serves as a support surface for a flat-tire operation.

Figure 4:
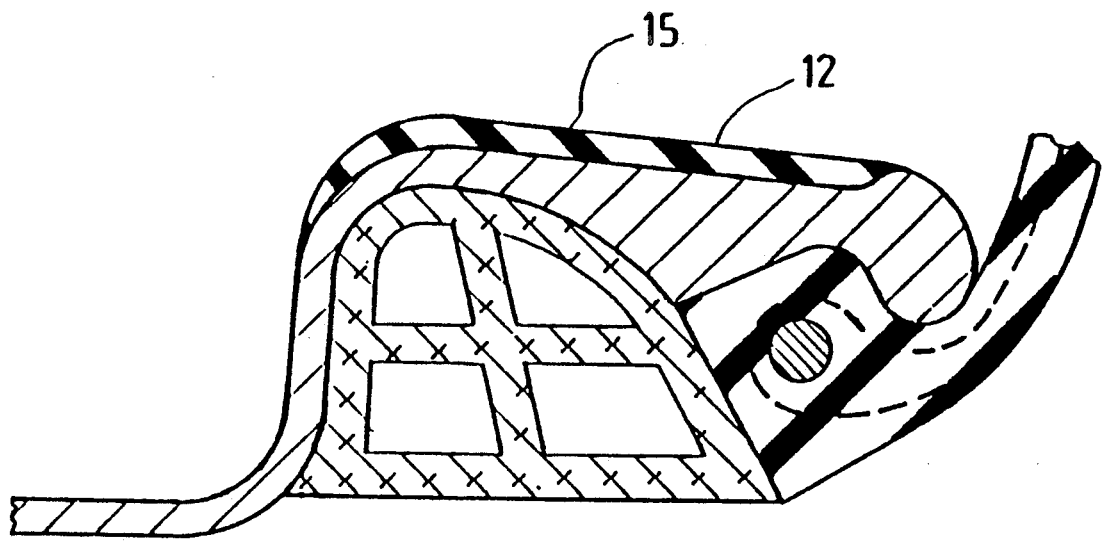
FIG. 4 is a cross-sectional view showing a modified cushion or padding layer for a flat-tire operation.

The vehicle wheel illustrated in FIG. 4 differs from that of FIG. 1 merely in that a rubber cushion or padding layer 15 is provided radially outwardly in the region of the support surface 12 for a flat-tire operation. Thus, this layer 15 then serves as a support surface during a flat-tire operation.

Figure 5:
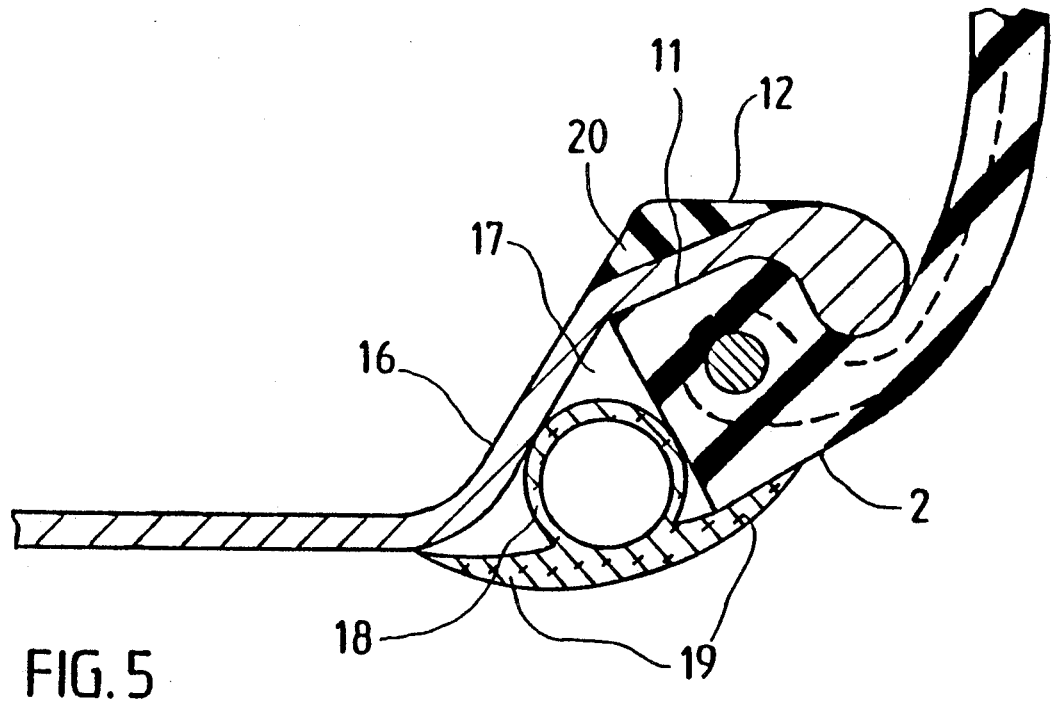
FIG. 5 is a cross-sectional view of a portion of a further exemplary embodiment of the inventive vehicle wheel where a wall of a drop-center directly adjoins the seating surface for the tire bead on the axially inner side.

FIG. 5 illustrates a modification where on the axially inner side the rim seating surface 11 directly joins a wall 16 of the drop-center, with this wall extending at an angle to the radial direction, so that between the tire bead 2 and the wall 16 a V-shaped space 17 is formed that is covered by a circumferential, tube-shaped cover or filler ring 18 that has two cover lips 19. Disposed radially outwardly of the rim seating surfaces 11 is a V-shaped rubber cushion or padding 20 that radially outwardly forms the support surfaces 12 for a flat-tire operation.

Figure 6:
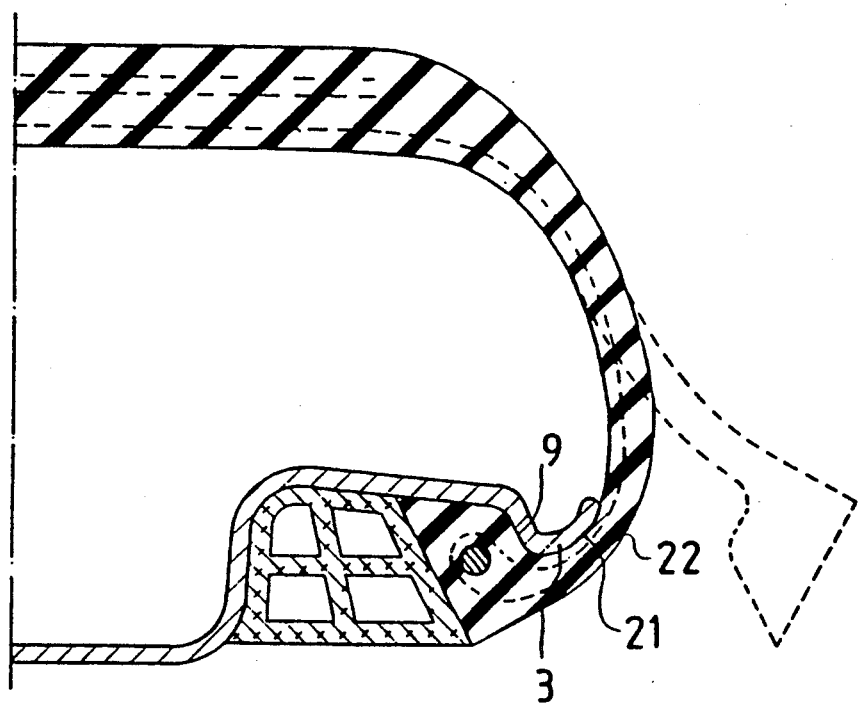
FIG. 6 is a partial radial cross-sectional view of another exemplary embodiment of the inventive vehicle wheel showing a rim flange that axially inwardly has an inclined abutment surface and axially outwardly also has an angled-off portion.

FIG. 6 illustrates a vehicle wheel that differs from state of the art wheels in several ways. For one thing, the abutment surface 9 of the rim flange 3 is inclined at an angle in the manner previously described. In addition, in the axially outer region 21 the rim flange 3 is also inclined, so that the tire wall 22 is supported over a larger region. The dashed-line orientation of the tire represents the vulcanization position.

Figure 7:
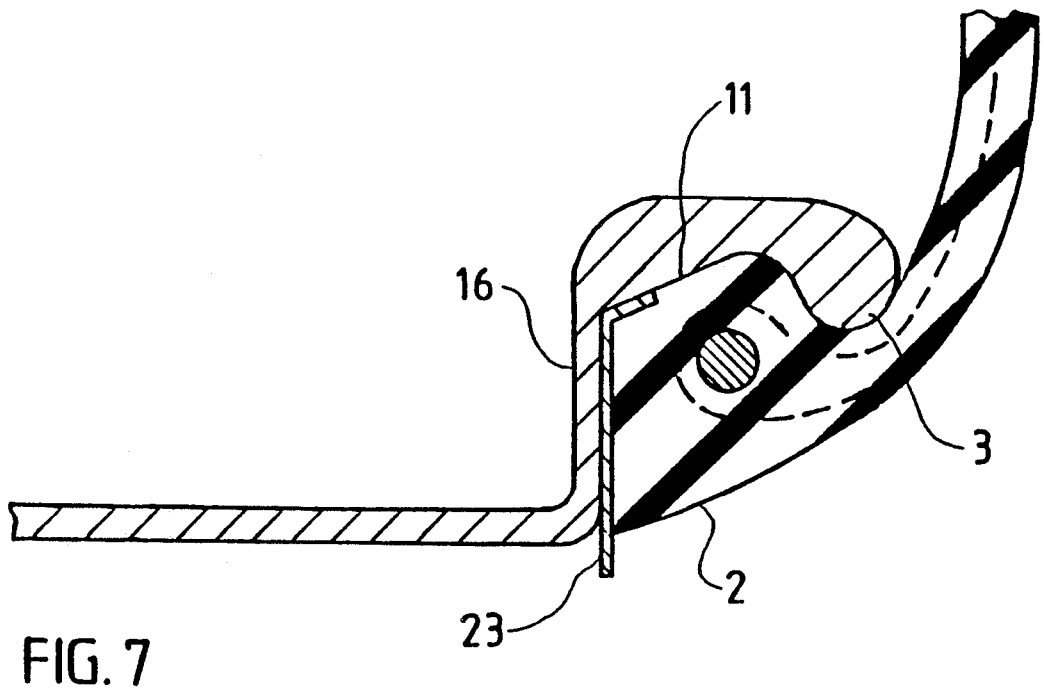
FIG. 7 is a partial cross-sectional view of yet another exemplary embodiment of the inventive vehicle wheel where the tire bead completely occupies the region between the rim flange and the wall of the drop-center.

The vehicle wheel illustrated in FIG. 7, which has an inclined rim flange 3 and an inclined rim seating surface 11, is characterized in that the space between the rim flange 3 and the wall 16 of the drop-center is completely occupied by the tire bead 2. Permanently inserted or vulcanized-on levers or strips 23 serve as aides in removing the tire. It is sufficient to distribute a number of these means 23 over the circumference.

Figure 8:
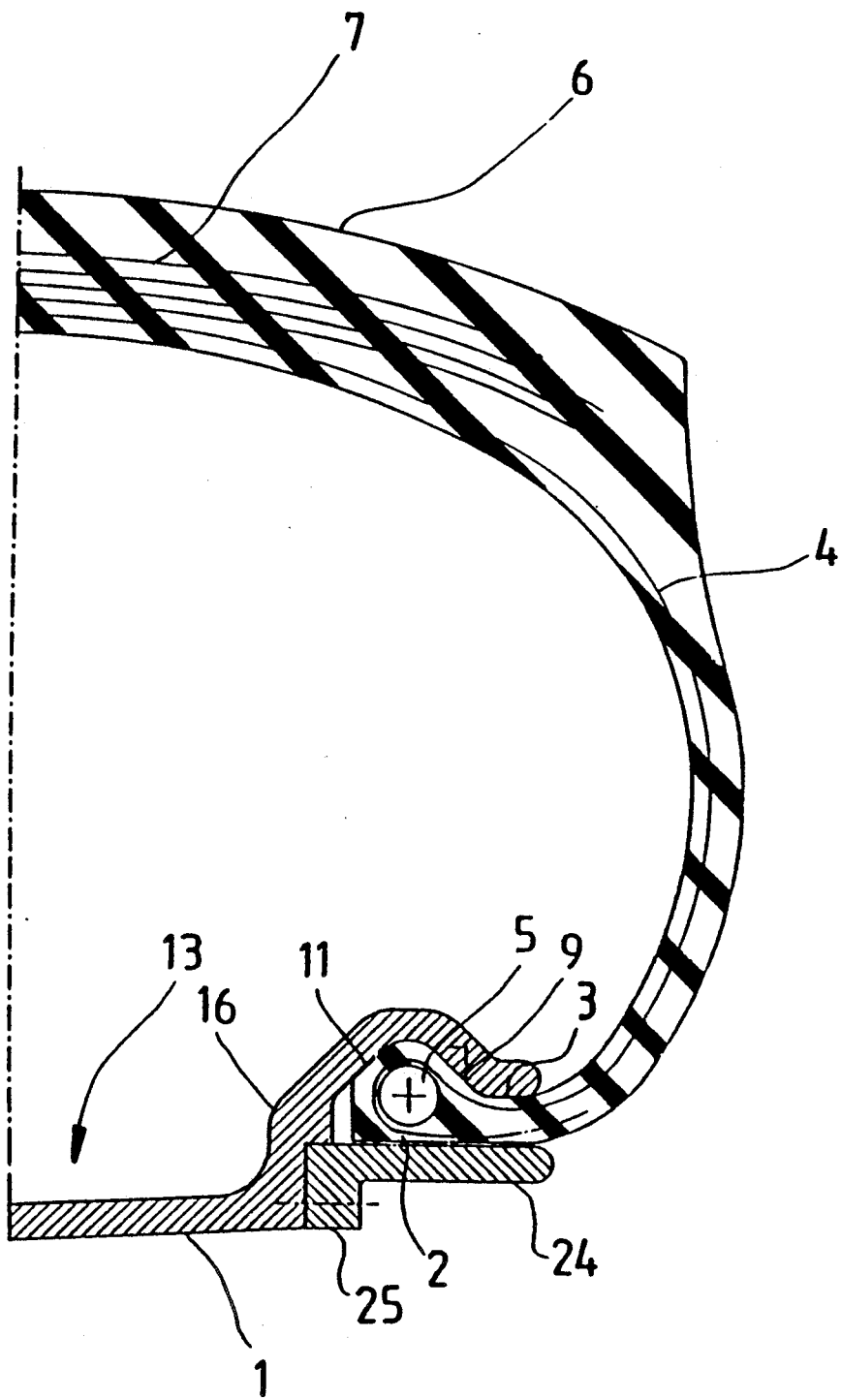
FIG. 8 is a partial radial cross-sectional view of a further exemplary embodiment of the inventive vehicle wheel showing a safety ring disposed radially inwardly of the tire bead.

FIGS. 8 and 9 illustrate vehicle wheels that are preferably used for trucks or busses. With such wheels, the tires again have a radial carcass 4 that is anchored in the bead portions 2 by being looped around pull and compression-resistant bead cores 5. A conventional multiply reinforcement belt 7 is disposed between the tread surface 6 and the carcass 4.

The rim in the embodiment of FIG. 8 is embodied as a drop-center rim and merges laterally outwardly from a predominantly inclined wall 16 into rim flanges 3 that are inclined relative to the radial direction. The abutment surface 9 of the rim flanges 3, and the rim seating surface 11, are inclined in conformity with the previously described angles. A known type of support element for a flat-tire operation (not illustrated) can be disposed in the region of the drop-center 13. Disposed radially inwardly of the bead portion 2 is a circumferential safety ring 24, the flange 25 of which is secured to the rim 1. The safety ring 24 of FIG. 8, which simultaneously has a centering effect, extends radially outwardly in a concentric manner and rests directly against the bead portion 2. When the tire is being inflated, the safety ring 24 exerts a clamping effect upon the bead portion 2.

The vehicle wheel illustrated in FIG. 9 differs from the embodiment of FIG. 8 in that it has a differently embodied rim 1, which in the central portion is provided with a support surface 12 for a flat-tire operation. In addition, the wheel of FIG. 9 has a conically extending safety ring 24 that acts like a clamping wedge upon the tire bead 2. Because of the interlocking manner in which the safety ring 24 fits into the rim 1, an additional centering effect is again achieved. In the region of the rim flange 3 and the rim seating surface 11, the vehicle wheel illustrated in FIG. 9 coincides with the previously described embodiments.

The safety rings 24 are provided at least on that side of a wheel that faces toward the outside of a vehicle. However, the safety rings 24 can also be provided for all of the tire beads 2.

The present invention is, of course, in no way restricted to the specific disclosure of the specification and drawings, but also encompasses any modifications within the scope of the appended claims.

What I claim is:

1. In a vehicle wheel for a pneumatic tire of elastomeric material, where the bead portions of the tire are disposed on the radially inner periphery of the wheel rim, and the carcass of the tire is anchored in said bead portions thereof by being looped around pull- and compression-resistant bead cores, and where the wheel has a rigid rim having essentially inwardly extending rim flanges and, axially inwardly thereof, rim seating surfaces for said bead portions of said tires, the improvement wherein:

each of said rim flanges has an abutment surface that faces one of said bead portions of said tire, with said abutment surfaces being inclined outwardly at an angle of between 5° and 50° relative to a radial direction; and said rim seating surfaces for said bead portions of said tire are inclined relative to an axial direction in such a way that said rim seating surfaces have their greatest diameter at said rim flanges, which are disposed axially outwardly of said rim seating surfaces, with the angle of inclination of said rim seating surfaces being between 10 and 40°.

2. A vehicle wheel according to claim 1, in which said angle of inclination of said abutment surfaces of said rim flanges is between 25° and 35°.

3. A vehicle wheel according to claim 1, in which said rim flanges each have an axially outer portion that is also inclined relative to a radial direction so as to provide a greater support surface for a wall of said tire.

4. A vehicle wheel according to claim 1, in which said angle of inclination of said rim seating surfaces is approximately 30°.

5. A vehicle wheel according to claim 1, in which disposed on a radially outer side of said rim, at least in the vicinity of said rim seating surfaces, are respective rubber padding layers that serve as support surfaces for a flat-tire operation.

6. A vehicle wheel according to claim 1, in which said rim has, adjacent each of said rim seating surfaces, a respective drop-center wall, with the space between each of said rim flanges and the associated drop-center wall being occupied by one of said bead portions of said tire, and with at least one location between said drop-center wall and said bead portions being provided with a tire-removal means such that the space between each of said rim flanges and the associated drop-center wall is completely occupied.

7. A vehicle wheel according to claim 1, in which at least one of said bead portions of said tire is provided with a safety ring that rests against a radially inner side of said bead portion.

8. A vehicle wheel according to claim 7, in which a radially outer side of said safety ring extends in a concentric manner.

9. A vehicle wheel according to claim 7, in which a radially outer side of said safety ring extends conically such that an axially outer portion of said safety ring has the greatest diameter.

* * * * *